(12) United States Patent
Garney

(10) Patent No.: US 6,886,062 B2
(45) Date of Patent: Apr. 26, 2005

(54) METHOD AND APPARATUS FOR IMPROVING TIME CONSTRAINTS AND EXTENDING LIMITED LENGTH CABLES IN A MULTIPLE-SPEED BUS

(75) Inventor: John I. Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 485 days.

(21) Appl. No.: 09/823,455

(22) Filed: Mar. 30, 2001

(65) Prior Publication Data

US 2002/0144042 A1 Oct. 3, 2002

(51) Int. Cl.[7] .......................... G06F 13/42; G06F 13/00; G06F 13/14
(52) U.S. Cl. .................. 710/106; 710/300; 710/305
(58) Field of Search ............................. 710/100, 300, 710/305–315, 105–106

(56) References Cited

U.S. PATENT DOCUMENTS

| | | | |
|---|---|---|---|
| 6,381,666 B1 * | 4/2002 | Kejser et al. | 710/300 |
| 6,584,519 B1 * | 6/2003 | Russell | 710/62 |
| 6,603,744 B1 * | 8/2003 | Mizutani et al. | 370/310 |
| 2002/0010821 A1 * | 1/2002 | Yu et al. | 710/100 |

FOREIGN PATENT DOCUMENTS

| | | | |
|---|---|---|---|
| WO | WO 00/49507 | 8/2000 | G06F/13/38 |
| WO | WO 01/08018 | 2/2001 | G06F/13/40 |

OTHER PUBLICATIONS

Universal Serial Bus Specification, Revision 2.0, Apr. 27, 2000, pp. i–xxviii, 1–40, 199–209, 297–554.*

* cited by examiner

Primary Examiner—Sumati Lefkowitz
(74) Attorney, Agent, or Firm—Kenyon & Kenyon

(57) ABSTRACT

A system and method are disclosed providing for broadened time constraints under USB 2.0 protocol, enabling extended cable spans, in addition to other benefits. The present invention in one embodiment utilizes 'split transactions' to take advantage of the relaxed latency requirements of this scheme, in addition to utilizing the 80/20 transaction ratio for USB 2.0 microframes. Another embodiment of the present invention improves timing constraints by providing a delay between start splits and complete splits equal to some number, 'N', of microframes. A further embodiment takes advantage of the fact that under USB 2.0, no transaction can span from one frame to the next, freeing one extra microframe per frame by virtue of phase shifting a slave device into appropriate synchnronization. Lastly, an embodiment of the present invention improves timing constraints by providing a delay between start splits and complete splits equal to a full frame (eight microframes).

30 Claims, 9 Drawing Sheets

METHOD AND APPARATUS FOR IMPROVING TIME CONSTRAINTS AND EXTENDING LIMITED LENGTH CABLES IN A MULTIPLE-SPEED BUS

BACKGROUND INFORMATION

The present invention relates to computer communication. More specifically, the present invention relates to a system that provides for broadened time constraints under a Universal Serial Bus (USB) protocol utilizing split transactions, enabling extended cable spans, in addition to other benefits. Present invention is related to application titled, "Method and Apparatus for Budget Development Under Universal Serial Bus Protocol in a Multiple Speed Transmission Environment", filed on even date herewith.

There are several methods for enabling communication between computers and between a computer and peripheral devices in the art today. One method of communication utilizes the Universal Serial Bus (USB) protocol. USB provides a computer with a means for communicating with up to 127 devices using a single, standardized communication scheme. USB version 1.0 (USB Rev. 1.1; USB Implementers Forum, Inc.) is capable of utilizing connecting cables of no longer than 5 meters each. The total distance between a host computer and a USB-attached peripheral device can be increased by using one or more hubs. Up to five hubs can be connected between cables (of up to five meters each) to provide a total, maximum cable span of 30 meters. This maximum cable span is imposed by the latency constraints of the USB 1.0 protocol. USB 1.0 is capable of transmission speeds of 1.5 Megabits (Mbps) ("Low" Speed) and 12 Mbps ("Full" Speed). Extending the cable span beyond the 30 meter recommended maximum, given the USB 1.0 maximum transmission rate, would violate the timing constraints imposed by the protocol, causing potentially unreliable performance.

Different methods have been utilized for extending the maximum cable span of USB 1.0. One method involves taking advantage of the re-try operation utilized by USB 1.0 to compensate for lossy cable environments. FIG. 1 provides an illustration of how cable extension is performed for USB 1.0 in the prior art using the re-try characteristic. A computer host 102 communicates with a peripheral device 104 via a USB 1.0 connection through a cable extender 106. USB utilizes a master/slave pattern of communication, wherein the host is the master, initiating all interactions (providing data or receiving data 108). In a 'data request' example under this scheme, a host 102 requesting data 108 from a device 104 first sends a token 110 over the first segment of full/low-speed bus 112 to full/low-speed 'First-In/First-Out' (FIFO) buffers 114. The token 110 is then translated to whatever protocol is utilized by a following long cable 118, by a first far transceiver 116. The token moves along the long cable 118 to another far transceiver 120 to be translated back to USB 1.0 full/low-speed. The token 110 is next forwarded to the device 104 over a second full/low-speed bus 122 by a packet repeater 124. Before response data 108 can be delivered from the device 104 to the host 102 over this extended cable configuration, the host is likely to time out 125 waiting for the data, after which the host will not accept the data as a response to the first token. The host 102 will, however, send at least one token re-try 126. Because of this configuration, data 108 received from the device 104 at the full/low-speed FIFOs 114 are stored at the FIFOs until the token re-try 126 is received by the FIFOs 114.

Upon receipt of the token re-try 126, the FIFOs 114 forward the data 108 on to the host 102. From the host's 102 perspective, the first token 110 was never received by the device 104 (because of line loss, etc.), and the data 108 was received only in response to the token re-try 126. With certain USB transactions, an acknowledgement is expected by the device 104 from the host. With the added distance of the long cable 118, there would be no way to return an acknowledgement from the host 102 to the device 104 (triggered by receipt of the data 108 at the host 102) before the device 104 enters a time out condition. Thus, the packet repeater 124 must create a 'false' acknowledgement 128b to send to the device. This is done right after the packet receiver 124 receives the data 108 from the device 104. The 'true' acknowledgement 128a is sent from the host 102 to the FIFOs 114 upon receipt of the data 108. The true acknowledgement 128a is not forwarded beyond this point.

The re-try scheme was established to maintain communication reliability. In utilizing this method for cable extension, one (or more) re-try in each transaction is used for cable extension, leaving one (or more) less re-try for error recovery. Consequently, reliability is reduced. Further, when a transaction requires an acknowledgement by the device 104, the packet repeater 124 must essentially 'lie' in creating the false acknowledgement 128b, and therefore, the device will believe, in each transaction, that the transaction was successful, regardless of what really happened. This undermines the effective reliability of the system. Finally, this scheme depends on 'slow' re-tries. If the configuration implements a shorter period between re-tries (or doesn't provide for re-tries at all), the cable-lengthening ability is reduced proportionately. As stated below, USB 2.0 (Revision 2.0; Apr. 27, 2000), for example, utilizes such fast re-tries that basically no cable-lengthening can be obtained through a method such as this.

A newer version of USB has been developed that incorporates various advantages over USB 1.0, including much accelerated data transmission. Titled "USB 2.0", the new version is approximately forty times faster than USB 1.0. It transmits data at 480 Mbps, called "high" speed (compared to the 12 Mbps of USB 1.0, 'full' speed). Under the USB protocol, re-tries may occur immediately one after another. This, combined with the dramatically increased speed of USB 2.0 and thus the increased speed of re-tries, make it impossible for the above-mentioned, simple 're-try' method to enable cable extension with the USB 2.0 protocol. The amount of time between re-tries under USB 2.0 is one-fortieth of that for USB 1.0.

It is therefore desirable to have a system that provides for broadened time constraints under USB 2.0 protocol, enabling extended cable spans, in addition to other benefits.

DETAILED DESCRIPTION

Figure 2:
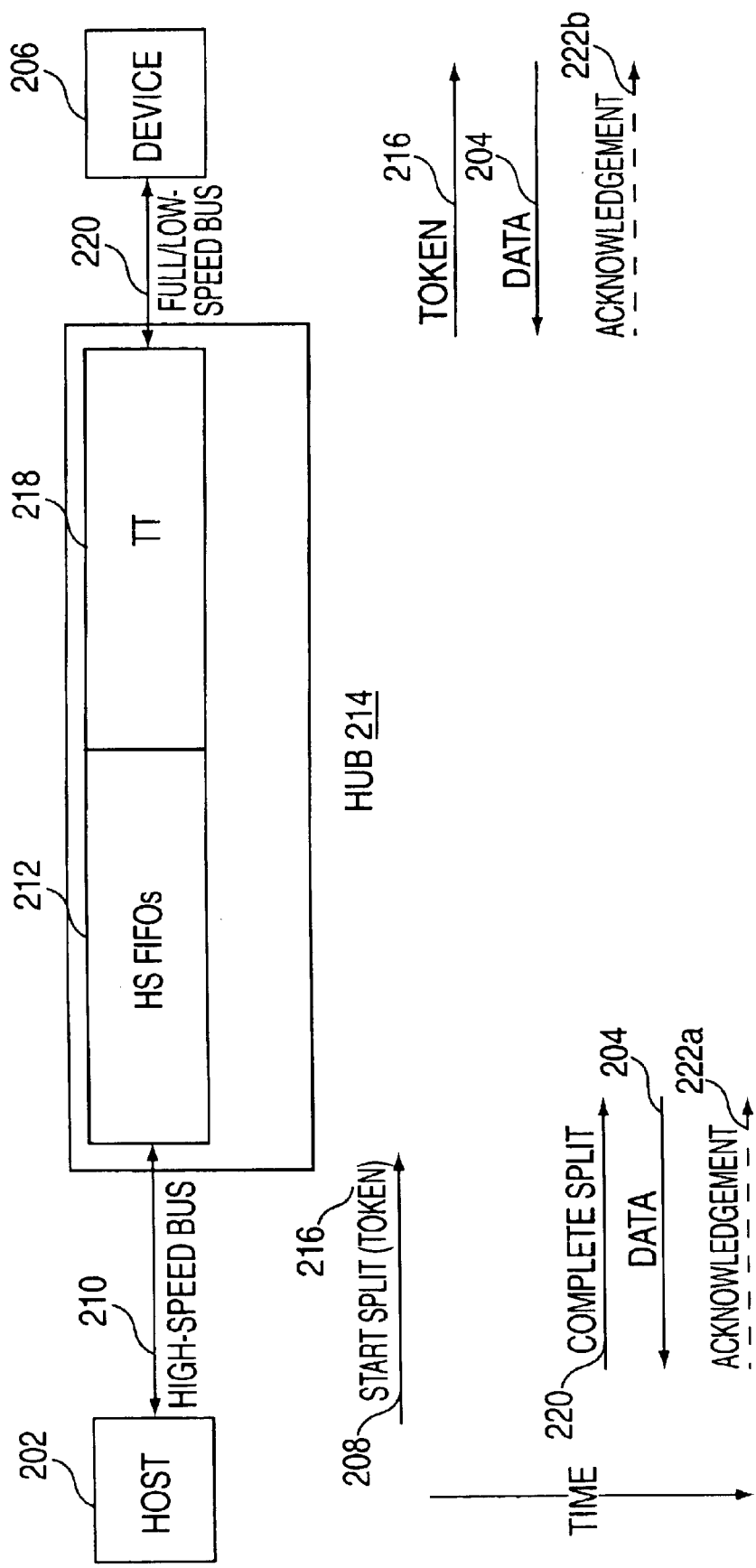
FIG. 2 provides a flow description for a USB 2.0 speed translation device utilizing split transactions.

FIG. 2 provides a flow description for a USB 2.0 speed translation device utilizing split transactions. In order to provide a data transfer interface between a high speed bus and full or low speed bus, speed translation is necessary. To explain the principles of the present invention, it is necessary to describe the operation of this USB 2.0 speed translation device, a method of budgeting transactions for which is described in application titled, "Method and Apparatus for Budget Development Under Universal Serial Bus Protocol in a Multiple Speed Transmission Environment", filed on even date herewith.

A host 202 that is, for example, requesting data 204 from a device 206, sends a preliminary message, called a 'start split' 208 along a high speed bus 210 to a set of high speed 'First-In, First-Out' buffers (FIFOs) 212 within a speed translation hub 214. The start split 208 contains an encoded representation of the data request token 216 to be sent to the device 206. The FIFOs 212 forward the token 216 (representation) on to a transaction translator (TT) 218, which coordinates the timing of the token 216 release to be appropriate for full/low speed. The token 216 is forwarded via a full/low speed bus 220 to the device 206.

In response, the device 206 sends the appropriate data 204 back over the full/low speed bus 220, through the TT 218, and on to the FIFOs 212 to be held there. At this point in time, a simple, non-'split transaction' data request would have long-since timed out, assuming that the device 206 is currently unreachable. However, under the split transaction protocol, a start split 208 is sent from the host 202 in order to begin the process, and then the host 202 and high speed bus 210 are freed to perform other operations (multiplexing) while a result is being generated and transmitted by the device 206. At some appropriate time after sending the start split 208, the host 202 sends a complete split 220 to the FIFOs, in expectation of the data 204 finally being there. In response to the complete split 220, the FIFOs 212 forward the data 204 to the host 202, and, if required, an acknowledgement 222b is returned from the TT 218 (local acknowledgment).

Note that at least two complete splits are provided in addition to the first complete split (or microframe-spanning representative number of complete splits plus two complete splits), one per microframe, in the following microframes for error recovery. For clarity, the additional complete splits will be described below with respect to FIGS. 7 and 8.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 3:
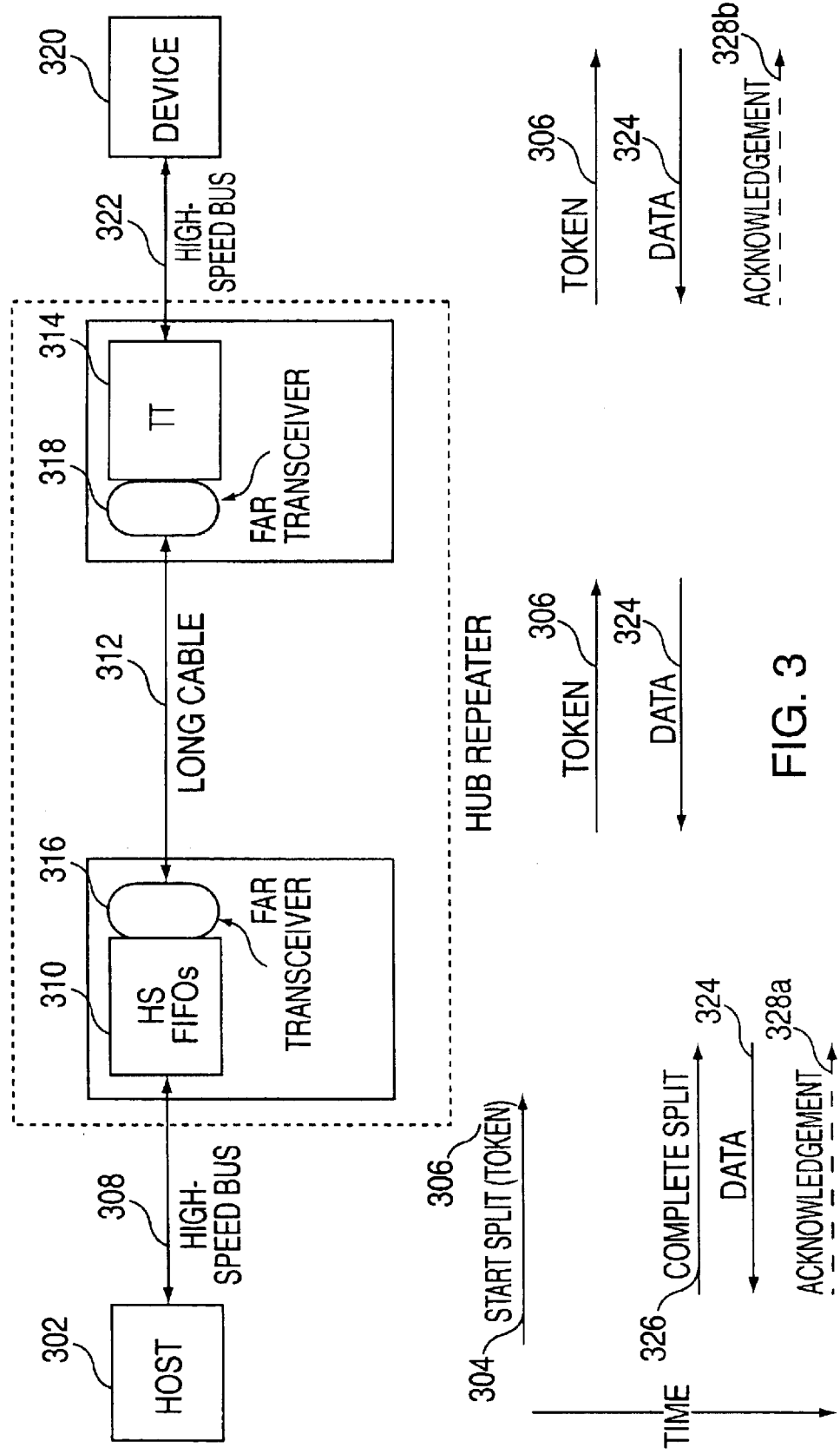
FIG. 3 describes the operation flow of a high-speed to high-speed USB 2.0 cable extender under principles of the present invention.

FIG. 3 describes the operation flow of a high-speed to high-speed USB 2.0 cable extender under principles of the present invention. In one embodiment of the present invention, a host 302, requesting data, for example, sends a start split 304, containing a data-requesting token 306, via a first high-speed bus 308 to a set of FIFOs 310. The token 306 is then sent along a long cable 312 to a transaction translator (TT) 314. Under one embodiment, the long cable 312 can utilize various possible media utilizing various protocols. For example, for very high-speed data transfer, a fiber optic cable might be utilized. An upstream far transceiver 316 and a downstream far transceiver 318 are used to encode and decode, respectively, the token 306 and other information to be compliant with whatever protocol is utilized for the long cable 312.

Figure 1:
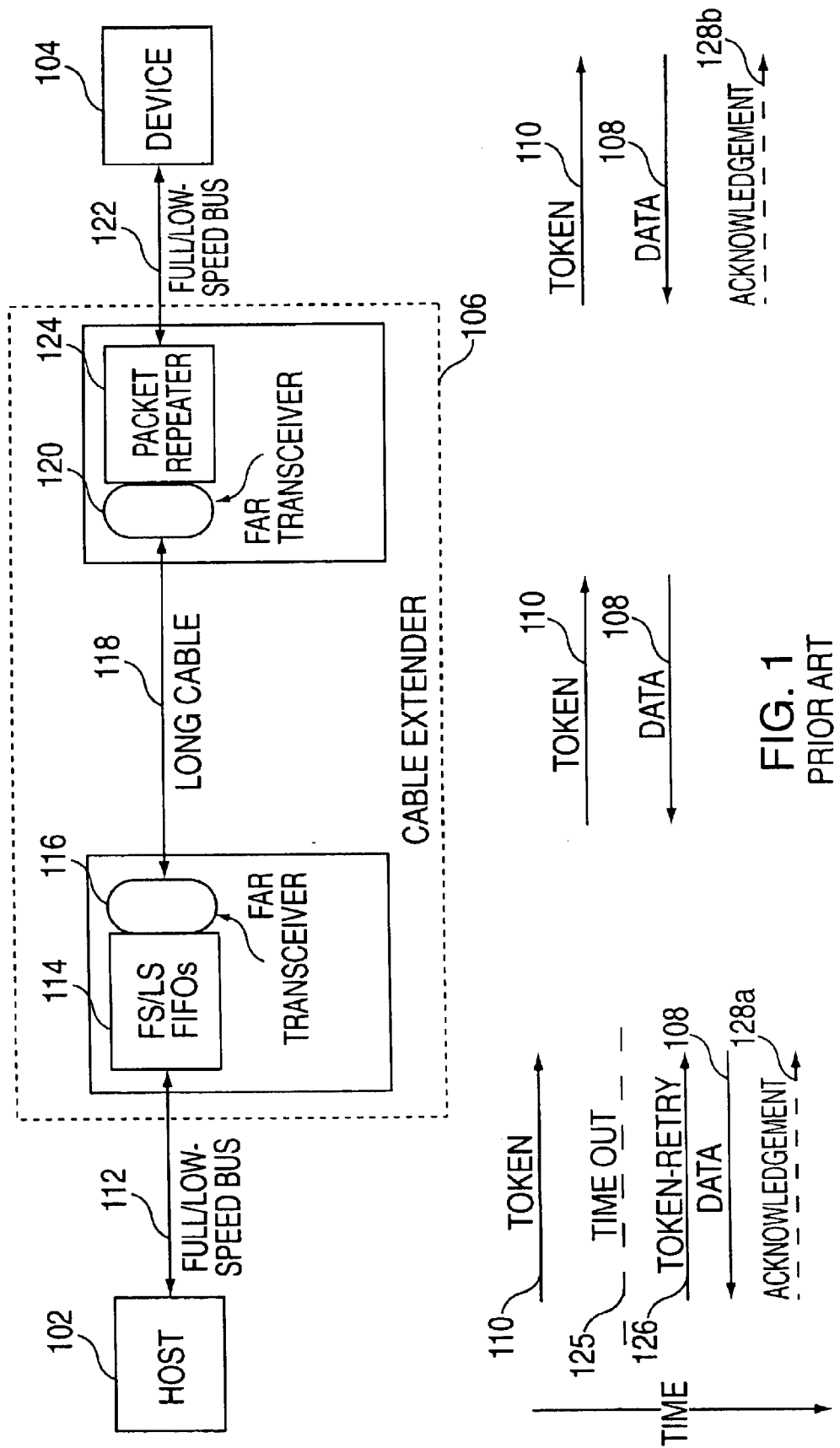
FIG. 1 provides an illustration of how cable extension is performed for USB 1.0 in the prior art using the re-try operation.

In one embodiment, the TT 314 forwards the data requesting token 306 to a device 320 via a second high-speed bus 322. In response, the device 320 sends back appropriate data 324. The data 324 is queued in the FIFOs while waiting for a complete split 326 to be received from the host 302 (the time for expected data receipt under a non-split transaction USB scenario has long-since passed). Upon receipt of the complete split 326, the FIFOs forward the data 324 to the host. If an acknowledgement signal is necessary for the transaction, a TT acknowledgement 328b is sent from the TT 314 to the device 320 upon receipt of the data 324 at the TT 314. The host acknowledgement 328a, similar to FIG. 1, is not forwarded past the FIFOs 310.

Figure 4:
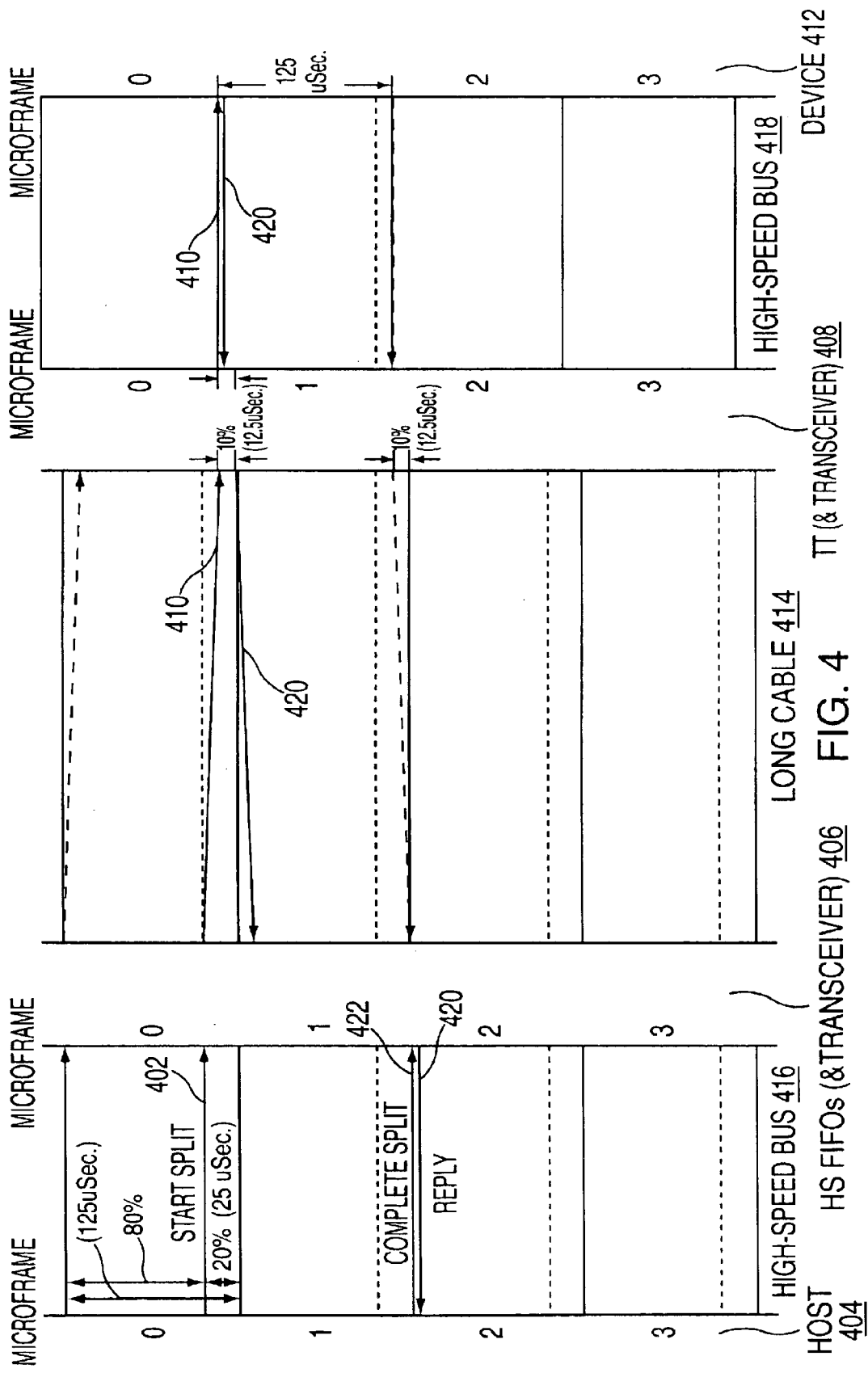
FIG. 4 provides a chart describing the timing of different events in the operation of a high-speed to high-speed cable extender under principles of the present invention.

FIG. 4 provides a chart describing the timing of different events in the operation of a high-speed to high-speed cable extender under principles of the present invention. USB 1.0 utilizes a metric of time measurement known as a 'frame'. Because USB 2.0 involves much greater speeds and thus, deals with much shorter time spans, a new metric has been created, called a 'microframe'. Under this protocol, one microframe is equal to 125 microseconds (uSec.) and is $\frac{1}{8}$ the length of a frame. Further, it is important to understand that under the USB 2.0 protocol, 'periodic' transactions (i.e. Isochronous and Interrupt transactions) may be transmitted only during the first 80% of any microframe. The last 20% (25 uSec.) is devoted to 'non-periodic' transactions (i.e. Control and Bulk transactions). Note that non-periodic transactions do utilize conventional re-tries (re-tries provided for the start splits), and thus, the present invention is more advantageous for periodic transactions (which do not have start split re-tries to utilize). However, the present invention can be utilized for both periodic and non-periodic transactions.

Looking at an arbitrary microframe in time, a first microframe, which may be called microframe 0, a start split 402 in one embodiment is sent from a host 404 (data request or data forward) via a first high-speed bus 416. Because of the 80/20 rule mentioned above, the start split 402 can be sent at any time during the first 80% of microframe 0, but no later. The high-speed FIFOs 406 receive the start split 402 and forward the token 410 (or data, if it's a data send rather than a data request) across a long cable 414 on to the TT 408.

Under USB 2.0 protocol, the token 410 can be forwarded from the TT 408 to a device 412 (via a second high-speed bus 418) no earlier than the beginning of the next microframe. Further, the device transaction is allowed to occur anytime during a second microframe, microframe 1 (with exceptions explained below). Because a start split 402 cannot be sent from the host 404 during the last 25 uSec. of each microframe, at least 12.5 uSec. is available for each direction of travel across the long cable even considering the worst-case scenario imposed by the above-mentioned parameters—the start split 402 being sent immediately before the last 20% of the microframe and the device transaction taking a full 125 uSec microframe. This worst-case scenario is traced in FIG. 4 with the solid arrows (as opposed to the dashed arrows).

In one embodiment, the utilization of this 12.5 uSec. travel time (minimum, each direction) is optimized by adjusting the time scale phase of the device 412. The device 412 phase is adjusted such that the series of microframes is identical to that of the host 404 except that by the device's 412 perception, each microframe occurs 12.5 uSec. earlier than it does for the host 404. This alteration makes it possible under the worst-case scenario for a token 410, coming from the host 404, to arrive at the TT 408 at exactly the beginning of the next microframe (microframe 1 here) and thus, be able to be instantly forwarded to the device 412. If the device 412 phase is not shifted and 12.5 uSec. of travel time were needed for the selected long cable 414 configuration, under the worst-case scenario, a reply 420 (data or acknowledgement) would not be received (from the device 412) at the TT 408 and forwarded until the beginning of a third microframe, microframe 2 (this example). The reply 420 would arrive at the FIFOs 406 12.5 uSec. into microframe 2. If a complete split 422 was received by the FIFOs before that, the transaction may be lost—there would have been no reply 420 in the FIFOs 406 to have been forwarded at that time.

Figure 5:
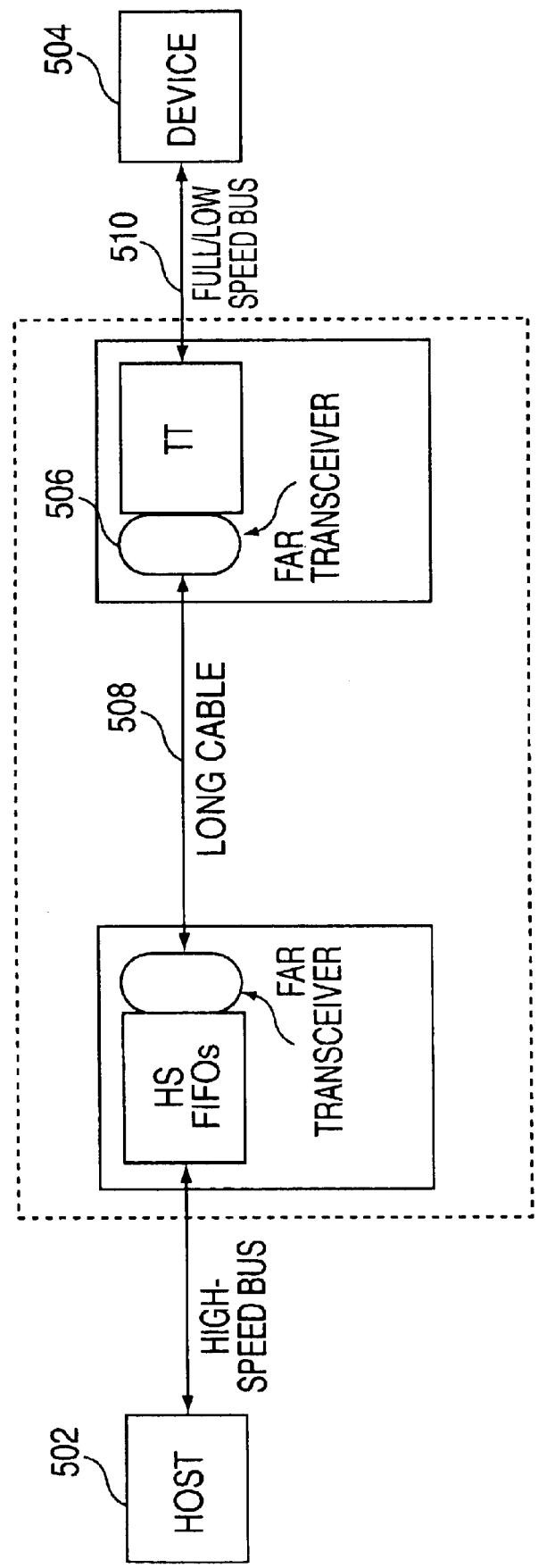
FIG. 5 provides a flow diagram of a high-speed to full/low-speed USB 2.0 cable extender under principles of the present invention.

FIG. 5 provides a flow diagram of a high-speed to full/low-speed USB 2.0 cable extender under principles of the present invention. In an embodiment of the present invention, the operational flow of the high-speed to full/low-speed cable extender is basically the same as the high-speed to high-speed cable extender shown in FIG. 3. The difference is that information passing between the host 502 and the device 504 is not converted by the second far transceiver 506 between the long cable's 508 protocol and the high-speed protocol. Rather, it is converted between the long cable's 508 protocol and the full/low-speed protocol, utilized by a full/low speed bus 510.

Figure 6:
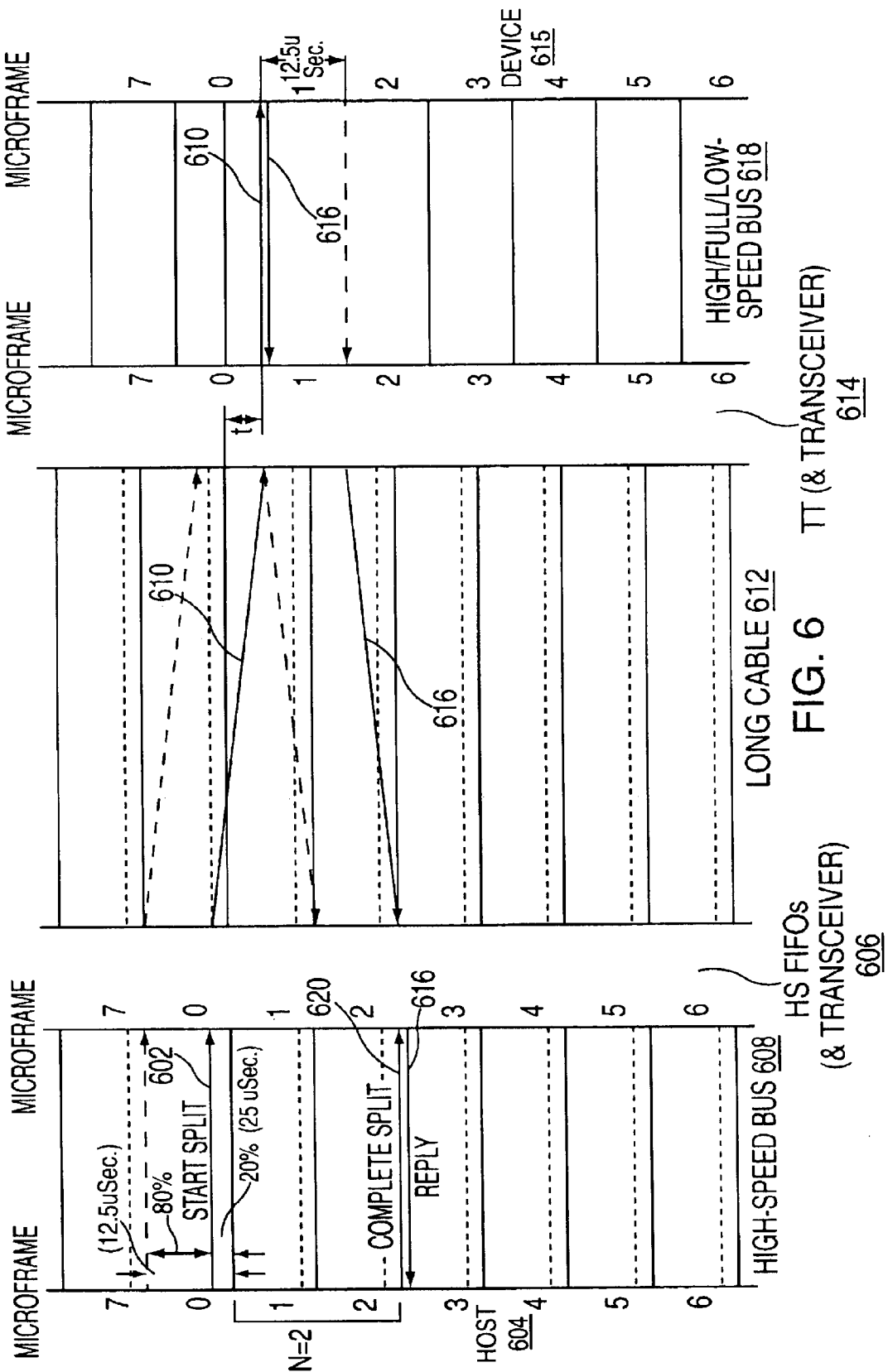
FIG. 6 provides a chart describing the timing of different events in the operation of a high-speed to high/full/low-speed cable extender utilizing an 'N' microframe delay between start and complete split under principles of the present invention.

FIG. 6 provides a chart describing the timing of different events in the operation of a high-speed to high/full/low-speed cable extender utilizing an 'N' microframe delay between start and complete split under principles of the present invention. Positive whole values can be chosen for N. In one embodiment, described in FIG. 6, N equals 2.

In one embodiment, a start split 602 is sent from the host 604 to the FIFOs 606 via a high-speed bus 608 during the first 80% of microframe 0. The token 610 is then forwarded from the FIFOs 606 to the TT 614 across the long cable 612. The amount of time provided for transmission across the long cable 612 is determined by the value of N. The greater the value of N, the longer distance the long cable 612 can span. Each unitary increase in the value of N provides for an increase in cable span equal to one half of a microframe (125 uSec./2), representative of a one microframe addition utilized for two directions of transmission.

The TT 614 sends the token 610 to the device 615 via a high/full/low speed bus 618. Similar to the embodiment described in FIG. 4, the phase of the microframe timing may be offset some time, 't', to optimize microframe constraints.

In one embodiment, the value of t would be determined by the value of N and the latency imposed by the distance/speed of the long to cable 612.

In one embodiment, a reply 616 is then returned from the device 615 and forwarded to the FIFOs 606, whereupon a complete split 620 from the host 604 is awaited. Upon receipt of the complete split 620, the reply 616 is sent to the host 604.

Figure 7:
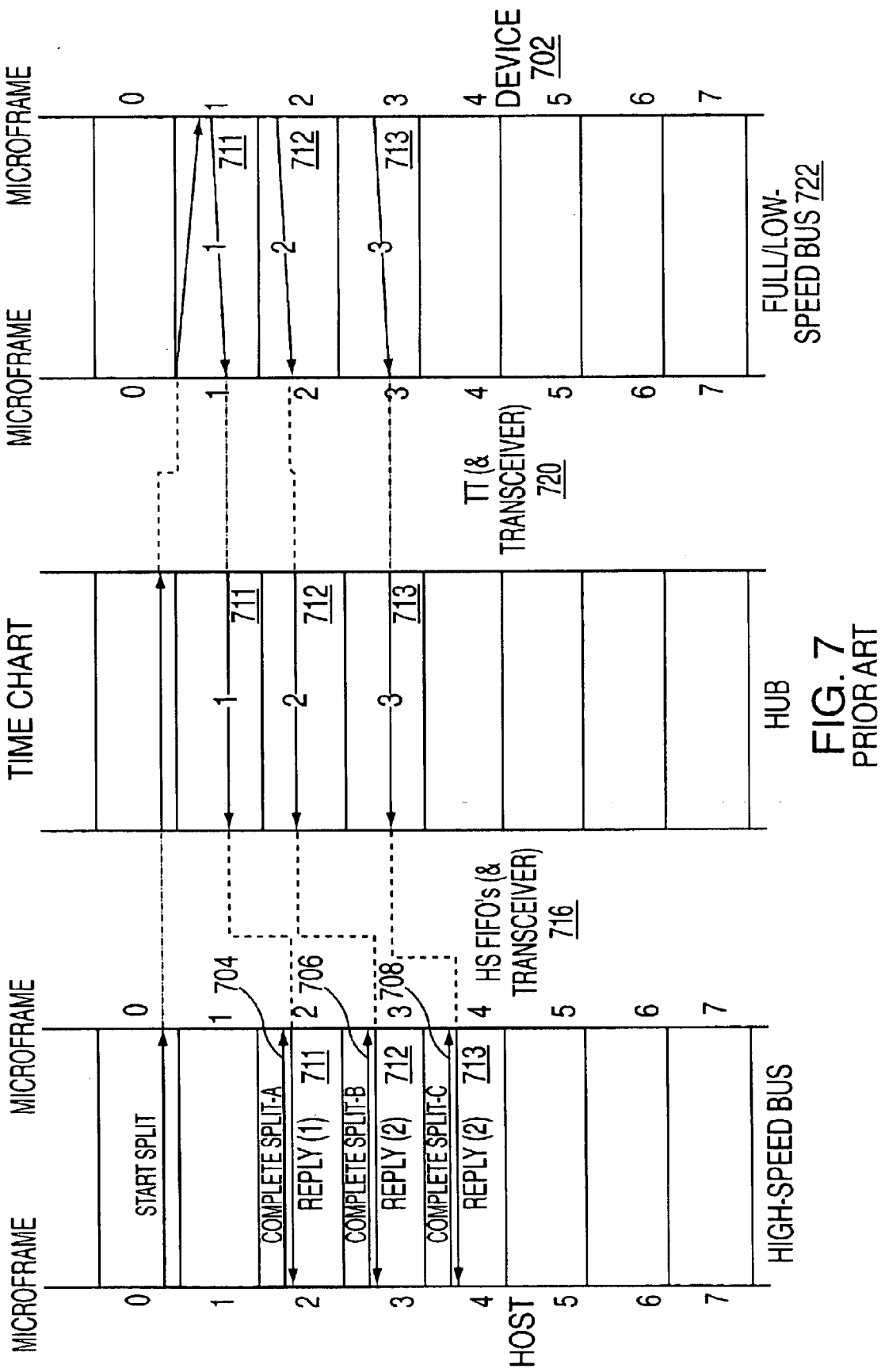
FIG. 7 provides a chart describing the timing of events in the operation of a high-speed to full/low-speed speed translation device in the prior art and showing the effects of transaction delaying sources.

FIG. 7 provides a chart describing the timing of events in the operation of a high-speed to full/low-speed speed translation device in the prior art and showing the effects of transaction delaying sources. When combined with a worst-case scenario (device allowed a full microframe), these sources of delay can cause a reply 704 to be forwarded substantially later than without these sources.

There are two significant sources of device transaction delay. One source is 'bit stuffing' and the other is 'bus reclamation'. Bit stuffing is necessary where a data stream remains unchanged (remains at '0' or at '1') for a certain number of bit units. Bit stuffing involves the insertion of a '0' bit into the data stream to cause an electrical transition on the data wires so that a Phase Locked Loop (PLL) system can remain attuned to the timing of the data stream. Bit stuffing can add up to 16% to the number of bits required to transmit a given transaction.

A bus reclamation source of delay happens when the TT 720 must wait to send a token (or data) to the device 702 because the full/low speed bus 722 is already being utilized for a non-periodic transaction. The non-periodic transaction must be completed before the periodic transaction can be run. This source of delay adds about an additional microframe on top of the allowed microframe transaction time of the device 702 for a reply 704,706,708 to be returned.

Because of potential delay caused by these sources, USB 2.0 protocol allows for there to be multiple complete splits. The number of complete splits provided is the number of microframes during which the device transaction occurs plus two additional complete splits. For example, if the device transaction spans no more than one microframe, three complete splits are provided (1+2).

Three complete splits 704,706,708 are sent out by the host 718 during their respective microframes to accommodate there being either no sources of delay, one source, or both sources, affecting arrival time of the reply 711,712,713 at the FIFOs 716. A reply, called 'reply(1)' 711, may be sent from the device 702 to the FIFOs 716 under a situation where the device needs minimal transaction time (no sources of delay). The reply(1) 711 arrives at the FIFOs 716 before the beginning of microframe 2 and is stored until the FIFOs 716 receive the first complete split, complete split-A 704. The reply(1)711 is then forwarded from the FIFOs 716 to the host 718.

If only one source of delay is experienced (i.e. bit stuffing (16% of one microframe) or bus reclamation (one microframe)), depending on how long the device 702 transaction takes, the reply, reply(2) 712, won't arrive at the FIFOs until some time during microframe 2. It may have missed complete split-A 704 (depending on when complete split-A was released within microframe 2). The reply(2) 712 would then remain in the FIFOs until complete split-B 706 is received. The reply(2) 712 is then forwarded to the host 718. If both sources of delay are involved, the reply, reply(3) 713, may be received at the FIFOs 716 well into microframe 3, possibly after complete split-B 706 has been received. The reply(3) 713 must then wait until the FIFOs 716 receive complete split-C 708 before being released to the host 708.

Figure 8:
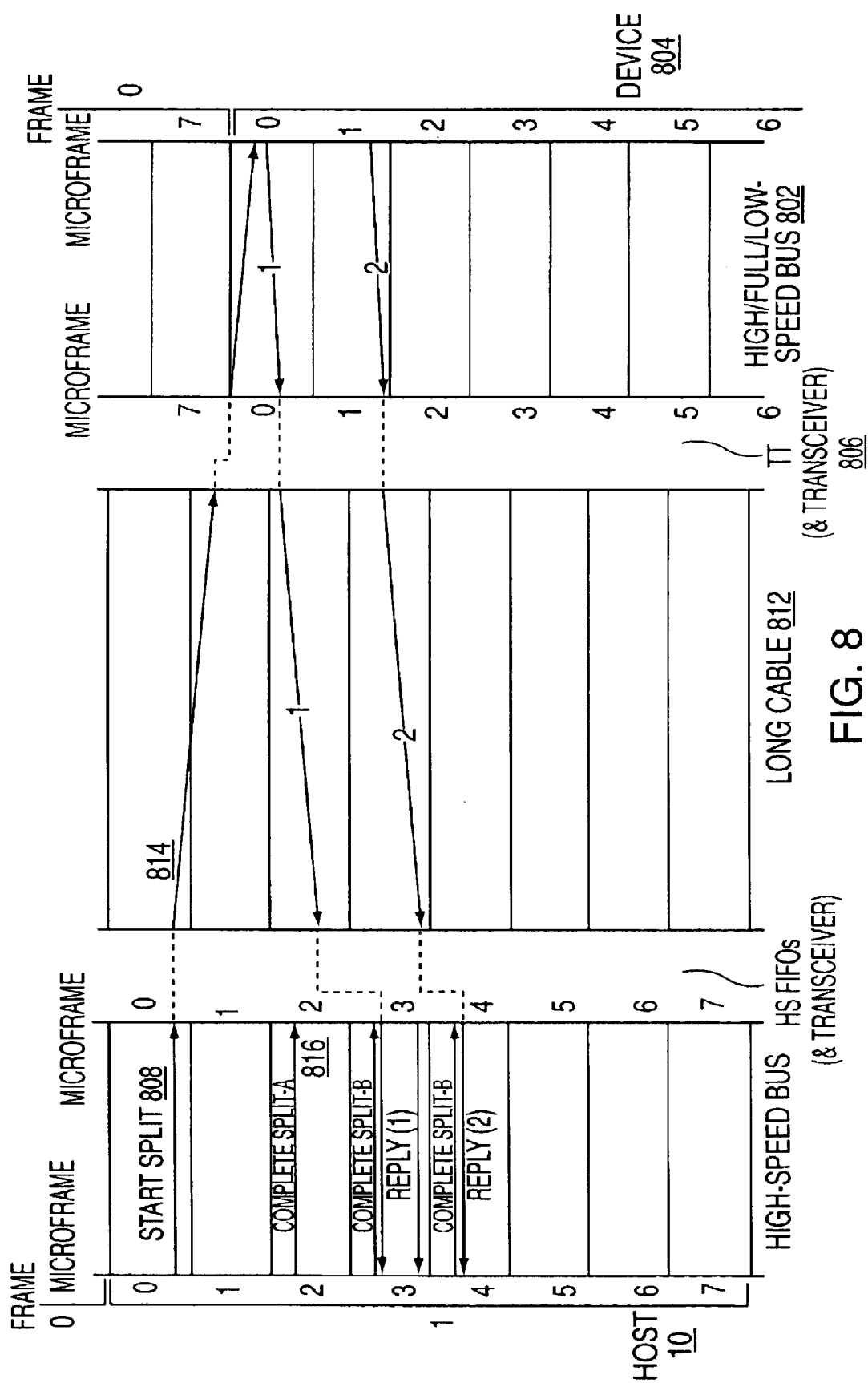
FIG. 8 provides a chart describing the timing of events in the operation of a high-speed to high/full/low-speed cable extender utilizing a timing scheme to take advantage of the effect of one of the two device transaction-delaying sources.

FIG. 8 provides a chart describing the timing of events in the operation of a high-speed to high/full/low-speed cable extender utilizing a timing scheme to take advantage of the effect of one of the two device transaction-delaying sources. As stated previously, each frame is comprised of eight microframes. Although transactions may span between microframes within single frames, USB 2.0 protocol prohibits the spanning of transactions from one frame to the next (spanning microframe 7 to the following microframe 0).

Time constraints of the system can be improved by taking advantage of this property. Because no transaction will ever continue from one frame to the following frame, it follows that at the very beginning of each frame (the beginning of each microframe 0), the high/full/low speed bus 802 will be available for transfer (no transaction will be continuing from the previous microframe, microframe 7). In order to take advantage of this, in one embodiment, the time base of the device 804 (and TT 806) is adjusted in phase to make it so that a start split (token) 808 leaving the host 810 at the last possible moment (20% before end of microframe 0), will arrive (the token 814) at the TT 806 (given the length/speed of the long cable 812) before the beginning of what the device 804 sees as being microframe 0 (phase shifted). Under this set-up, the token 814 will be waiting in the TT 806, ready to be the first transfer of the high/full/low speed bus 802 of that frame. This eliminates the possibility of having the one-microframe bus reclamation delay during the first microframe of each frame. Knowing there is this extra one microframe per frame that will not be lost due to delay allows a percentage increase in long cable 812 length (for a given speed) without fear of performance degradation.

In one embodiment, the long cable 812 is increased in length to some threshold, at which further increase would affect system reliability. This increase in long cable 812 length causes the complete split-A 816 to be much less likely of ever being utilized. In one embodiment, the first complete split may be removed because of it being unnecessary.

Figure 9:
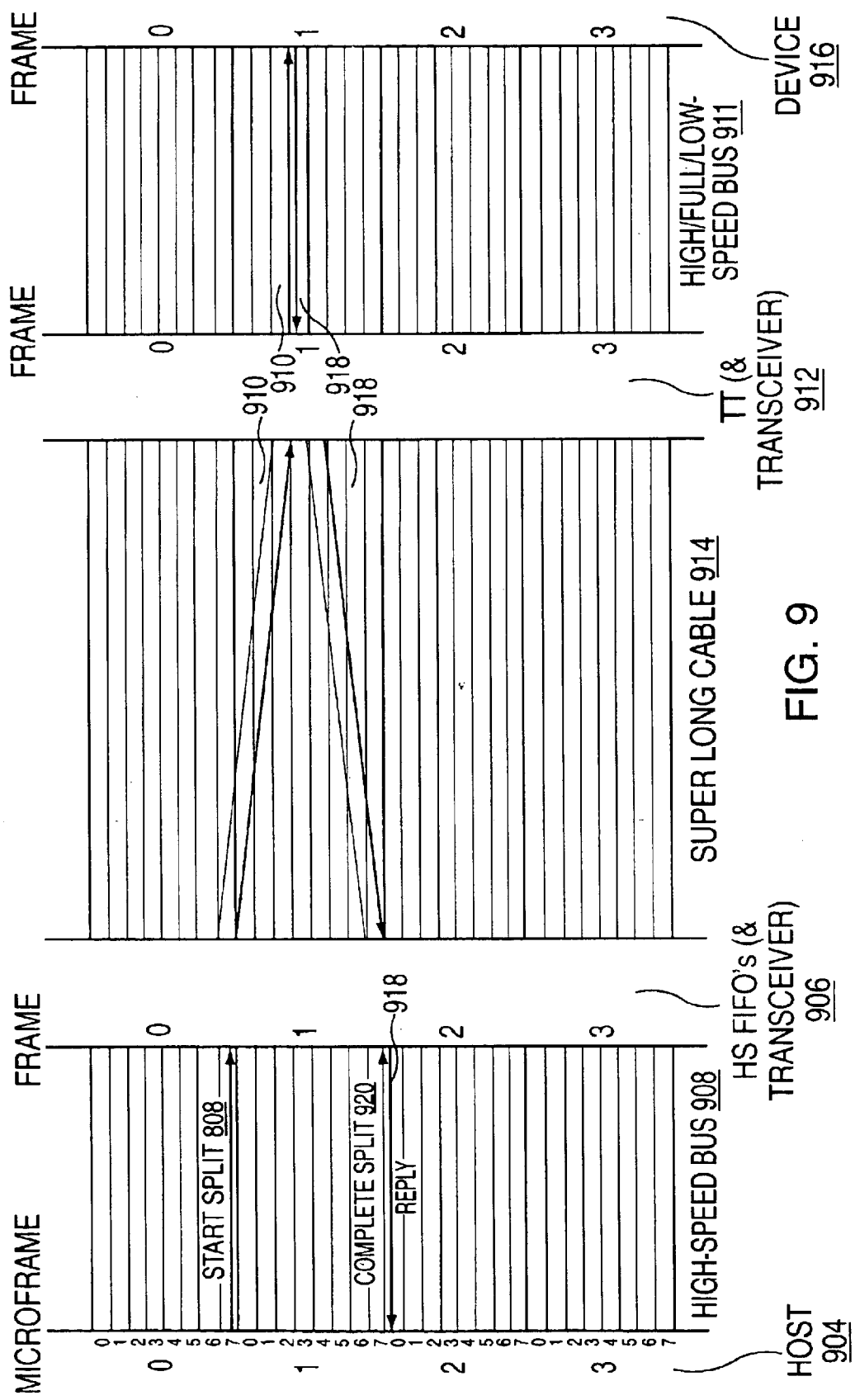
FIG. 9 provides a chart describing the timing of different events in the operation of a high-speed to high/full/low-speed cable extender utilizing one frame (eight microframes) of delay between start split and complete split under principles of the present invention.

FIG. 9 provides a chart describing the timing of different events in the operation of a high-speed to high/full/low-speed cable extender utilizing N frames (where each frame is eight microframes) of delay between start split and complete split under principles of the present invention. In one embodiment, the start split 902 is sent from the host 904 to the FIFOs 906 via the high-speed bus 908 during the first 80% of microframe 7 in frame 0. The token (or representation thereof) 910 is forwarded to the TT 912 across a super long cable 914. The token 910 is then sent, via a high/full/low-speed bus 911, to the device 916, whereupon a reply 918 is generated and forwarded to the FIFOs 906. The token 918 is held until a complete split 920 is received at the FIFOs 906, and the token 916 is sent on to the host 904. Note, as stated above, that more than one complete split will be utilized for error compensation.

Utilizing a delay between the start and complete split that corresponds to a frame length of time potentially reduces the amount of hardware and/or software changes necessary for implementation as compared to providing an 'N' microframe delay.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system for communication between a host and a device, comprising:
   a host coupled to a storage element by a first high-speed bus; and
   a device coupled to a data forwarding element by a second high-speed bus; wherein
   said data forwarding element is coupled to said storage element via a data transmission medium;
   said device is to receive a start message of a split transaction from the host; and
   said device is to send a reply, in response to the start message, for storage in the storage element; wherein after a completion message of a split transaction is sent from the host to the storage element, said reply is to be sent from the storage element to the host.

2. The system of claim 1, wherein the start message is a data request, the completion message is a data request follow-up, and the reply is a data reply.

3. The system of claim 1, wherein the start message is a data send, the completion message is a data send follow-up, and the reply is a data receipt acknowledgement.

4. The system of claim 1, wherein the first high-speed bus and the second high-speed bus operate under Universal Serial Bus (USB) protocol.

5. The system of claim 4 further comprising:
   a first transceiver communicatively coupled between the storage element and the data transmission medium; and
   a second transceiver communicatively coupled between the data transmission medium and the data forwarding element; wherein
   said first transceiver and said second transceiver are to provide protocol translation, allowing non-USB protocol transmission on the data transmission medium.

6. The system of claim 1, wherein the storage element is a First In, First Out (FIFO) buffer and the data forwarding element is a transaction translator.

7. The system of claim 1, wherein the data transmission medium is a data transmission cable.

8. The system of claim 1, wherein the data transmission medium is a wireless data transmission device.

9. A system for communication between a host and a device, comprising:
   a host coupled to a storage element by a first high-speed bus; and
   a device coupled to a data forwarding element by a second high-speed bus; wherein
   said data forwarding element is coupled to said storage element via a data transmission medium;
   said device is to receive a preliminary message from the host; and said device is to send a reply, in response to the preliminary message, for storage in the storage element; wherein after at least one secondary message is sent from the host to the storage element, said reply is to be sent from the storage element to the host; wherein:
   during a first microframe of a plurality of microframes, each microframe having a microframe duration of equal value, the preliminary message is to be sent from the host to the storage element;
   the preliminary message is to be sent from the data forwarding element to the device and the reply is to be sent from the device to the data forwarding element during a second microframe; and
   the at least one secondary message is to be sent from the host to the storage element and the reply is to be sent from the storage element to the host during a third microframe.

10. The system of claim 9, wherein:
the data forwarding element and the device maintain a perception of each microframe that is advanced in phase an advance amount with respect to the perception of each microframe by the host and the storage element.

11. The system of claim 10, wherein the advance amount is equal to ten percent of the microframe duration.

12. A system for communication between a host and a device, comprising:
a host coupled to a storage element by a first high-speed bus; and
a device coupled to a data forwarding element by a second high-speed bus; wherein
said data forwarding element is coupled to said storage element via a data transmission medium;
said device is to receive a preliminary message from the host;
said device is to send a reply, in response to the preliminary message, for storage in the storage element; wherein after at least one secondary message is sent from the host to the storage element, said reply is to be sent from the storage element to the host; and wherein:
during a first microframe of a plurality of microframes, each microframe having a microframe duration of equal value, the preliminary message is to be sent from the host to the storage element;
the device is coupled to the data forwarding element by a high/full/low-speed bus;
the preliminary message is to be sent from the data forwarding element to the device and the reply is to be sent from the device to the data forwarding element during a span of time beginning at and including a second microframe and continuing until some value 'N'−1 microframes after said second microframe; and
the at least one secondary message is to be sent from the host to the storage element and the reply is to be sent from the storage element to the host during a last microframe, 'N' microframes after said second microframe.

13. The system of claim 12, wherein the data forwarding element and the device maintain a perception of each microframe that is advanced in phase an advance amount with respect to the perception of each microframe by the host and the storage element.

14. The system of claim 12, wherein 'N' is a positive whole number.

15. A system for communication between a host and a device, comprising:
a host coupled to a storage element by a first high-speed bus; and
a device coupled to a data forwarding element by a second high-speed bus; wherein
said data forwarding element is coupled to said storage element via a data transmission medium;
said device is to receive a preliminary message from the host;
said device is to send a reply, in response to the preliminary message, for storage in the storage element; wherein after at least one secondary message is sent from the host to the storage element, said reply is to be sent from the storage element to the host; and wherein:
during a first host microframe of a plurality of microframes within a frame of a plurality of frames, each microframe having a microframe duration of equal value, the preliminary message is to be sent from the host to the storage element;
the device is coupled to the data forwarding element by a high/full/low-speed bus;
the data forwarding element and the device maintain a perception of each microframe that is advanced in phase an advance amount with respect to the perception of each microframe by the host and the storage element, such that the preliminary message can be sent from the data forwarding element to the device at the beginning of a first device microframe and the reply is to be sent from the device to the data forwarding element during said first device microframe; and
the at least one secondary message is to be sent from the host to the storage element once per microframe, starting with the third host microframe, until some value 'M' microframes have passed.

16. The system of claim 15, wherein the at least one secondary message is to be sent from the host to the storage element once per microframe, starting with the third host microframe, until the reply is received by the host.

17. The system of claim 16, wherein 'M'=3.

18. A system for communication between a host and a device, comprising:
a host coupled to a storage element by a first high-speed bus; and
a device coupled to a data forwarding element by a second high-speed bus; wherein
said data forwarding element is coupled to said storage element via a data transmission medium:
said device is to receive a preliminary message from the host; and said device is to send a reply, in response to the preliminary message, for storage in the storage element; wherein after at least one secondary message is sent from the host to the storage element, said reply is to be sent from the storage element to the host; wherein:
during an eight microframe of a plurality of microframes within a first frame of a plurality of microframes, each microframe having a microframe duration of equal value and each frame consisting of an equal number of microframes, the preliminary message is to be sent from the host to the storage element;
the device is coupled to the data forwarding element by a high/full/low-speed bus;
the preliminary message is to be sent from the data forwarding element to the device and the reply is to be sent from the device to the data forwarding element during a second frame of said plurality of frames; and
the at least one secondary message is to be sent from the host to the storage element and the reply is to be sent from the storage element to the host during a first microframe of a third frame of said plurality of frames.

19. The system of claim 18, wherein each frame consists of eight microframes.

20. A for communication with a host,
said device to receive start message of a split transaction from a host via a storage element and a data forwarding device and to transmit a reply for storage in said storage element until a completion message of a split transaction is received from the host, whereupon the reply is sent from the storage element to the host; wherein
said host is coupled to said storage element by a first high-speed bus;

said device is coupled to said data forwarding element by a second high-speed bus; and said data forwarding element is coupled to said storage element via a data transmission medium.

21. The device of claim 20, wherein the first high-speed bus and the second high-speed bus operate under Universal Serial Bus (USB) protocol.

22. The device of claim 21 further comprising:

a first transceiver communicatively coupled between the storage element and the data transmission medium; and a second transceiver communicatively coupled between the data transmission medium and the data forwarding element; wherein said first transceiver and said second transceiver are to provide protocol translation, allowing non-USB protocol transmission on the data transmission medium.

23. A method for communication between a host and a device, comprising:

coupling a host to a storage element by a first high-speed bus;

coupling a device to a data forwarding element by a second high-speed bus;

coupling said data forwarding element to said storage element via a data transmission medium;

receiving a start message of a split transaction by said device from said host; and sending, by said device, a reply, in response to the start message, for storage in the storage element; and sending by the storage element, after a completion message of a split transaction is sent from the host to the storage element, said reply from the storage element to the host.

24. The system of claim 23, wherein the start message is a data request, the completion message is a data request follow-up, and the reply is a data reply.

25. The system of claim 24, wherein the start message is a data send, the completion message is a data send follow-up, and the reply is a data receipt acknowledgement.

26. The system of claim 23, wherein the first high-speed bus and the second high-speed bus operate under Universal Serial Bus (USB) protocol.

27. A set of instructions residing in a storage medium, said set of instructions capable of being executed by a processor to communicate between a host and a device, comprising:

coupling a host to a storage element by a first high-speed bus;

coupling a device to a data forwarding element by a second high-speed bus;

coupling said data forwarding element to said storage element via a data transmission medium;

receiving a start message of a split transaction by said device from said host; and sending, by said device, a reply, in response to the start message, for storage in the storage element; and sending, by the storage element, after a completion message of a split transaction is sent from the host to the storage element, said reply from the storage element to the host.

28. The system of claim 27, wherein the start message is a data request, the completion message is a data request follow-up, and the reply is a data reply.

29. The system of claim 27, wherein the start message is a data send, the completion message is a data send follow-up, and the reply is a data receipt acknowledgement.

30. The system of claim 27, wherein the first high-speed bus and the second high-speed bus operate under Universal Serial Bus (USB) protocol.

* * * * *

UNITED STATES PATENT AND TRADEMARK OFFICE
CERTIFICATE OF CORRECTION

PATENT NO. : 6,886,062 B2
DATED : April 26, 2005
INVENTOR(S) : John I. Garney

It is certified that error appears in the above-identified patent and that said Letters Patent is hereby corrected as shown below:

Column 10,
Line 59, "A for communication" should be -- A device for communication --

Signed and Sealed this

Twelfth Day of July, 2005

JON W. DUDAS
*Director of the United States Patent and Trademark Office*